Patented Aug. 22, 1944

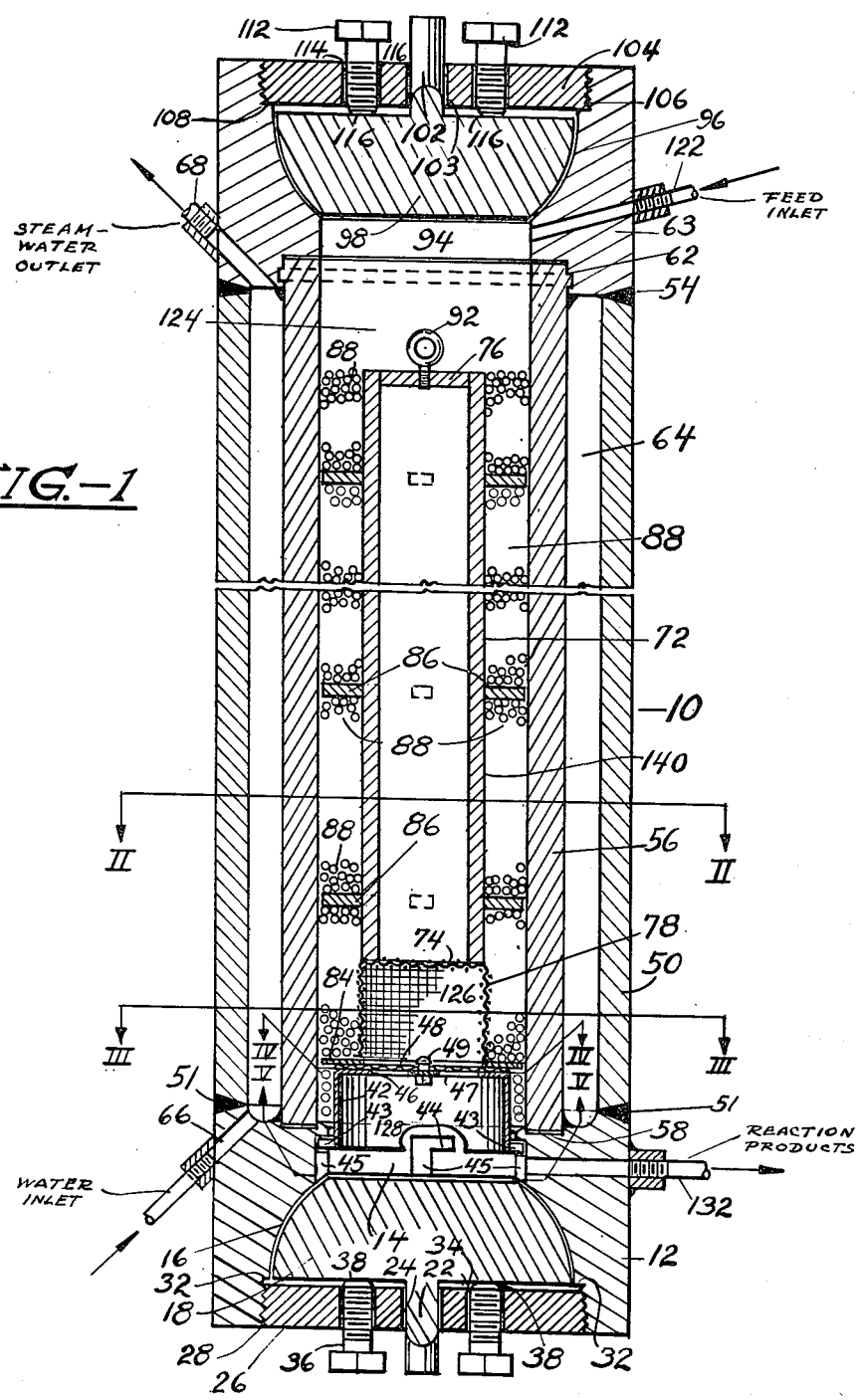

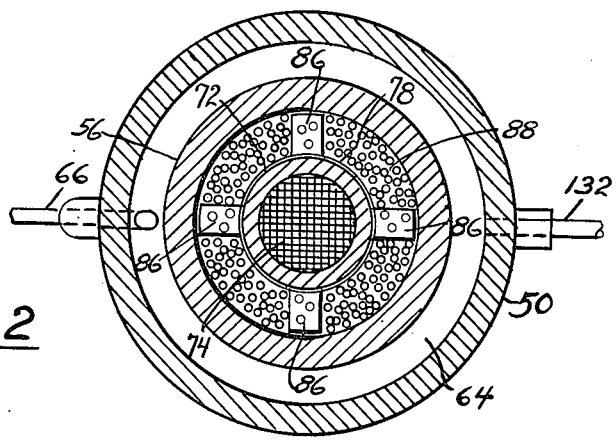
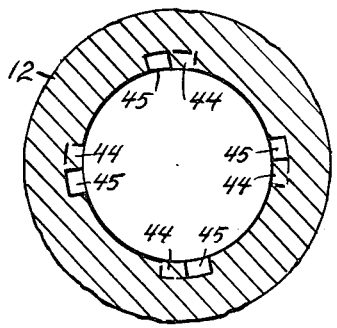
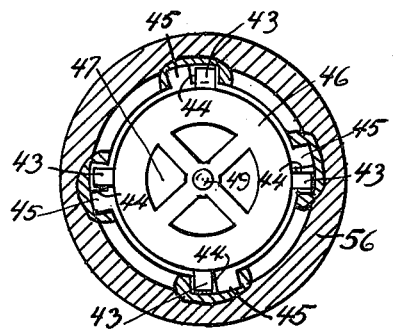
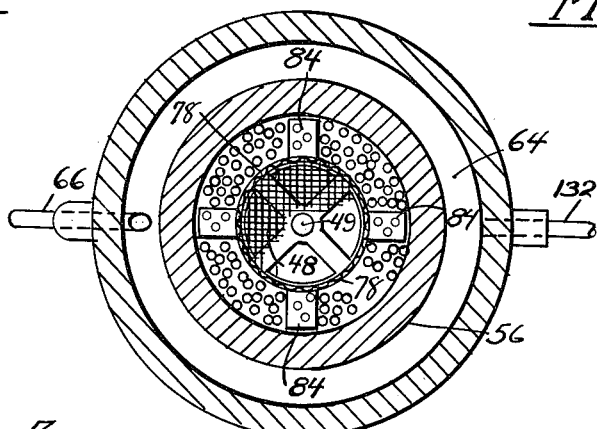

2,356,700

UNITED STATES PATENT OFFICE 2,356,700

TREATING HYDROCARBON FLUIDS

Walter H. Rupp, Mountainside, and Clarke T. Harding, Hillside, N. J., assignors to Standard Oil Development Company, a corporation of Delaware Application March 11, 1942, Serial No. 434,208

3 Claims. (Cl. 23—289)

This invention relates to a method of and apparatus for catalytic polymerization of olefins to produce high octane hydrocarbon compositions.

In the prior art processes are known for selective and non-selective catalystic polymerization of normally gaseous olefins to produce normally liquid hydrocarbons which may be used as motor fuels or as blending agents to produce high octane gasoline or aviation gasoline. In non-selective catalytic polymerization processes it is usual practice to use relatively large tubes filled with catalyst granules or pills and the heated olefin gases pass over the catalyst to produce relatively high octane number hydrocarbon mixtures.

However, when selective polymerization is used the tubes or reactors are made much smaller in diameter in order to obtain better temperature control to produce selectively those unsaturated polymer compounds, which when hydrogenated, will yield higher octane number hydrocarbon mixtures than the non-selective polymers and will also produce higher yields of such hydrocarbon mixtures.

According to our invention, a reactor is provided which may be used in non-selective catalytic polymerization and which may be easily converted to selective polymerization of olefins. Our invention provides a reactor in which better temperature control is obtained than with previous selective polymerization processes and, in addition, longer catalyst life is obtained.

According to our invention, a core is introduced into the reactor tube and catalyst is introduced into the reactor around the core to form an annular bed of catalyst granules or pills. By varying the size of the core the thickness of the catalyst bed may be varied to obtain desired temperature control during reaction.

In the drawings:

Fig. 1 represents a longitudinal vertical cross-section of a reactor constructed to embody our invention;

Fig. 2 represents a transverse horizontal cross-section taken substantially along line II—II of Fig. 1;

Fig. 3 represents a horizontal cross-section taken substantially along line III—III of Fig. 1;

Fig. 4 represents a horizontal cross-section taken substantially along line IV—IV of Fig. 1;

Fig. 5 represents a partial horizontal cross-section on line V—V of Fig. 1 showing the slots for the breech-lock device.

In the drawings the reference character 10 generally designates the reactor which is provided with a base member 12 having a central opening extending therethrough and generally designated 14. Intermediate its ends the opening 14 is provided with a curved seating surface 16 to receive the plug 18 which is securely held in position against the seating surface to maintain pressure in the reactor.

The plug 18 is provided with an arm 22 extending from the plug through opening 24 in a securing member 26. The securing member 26 is circular and is provided with screw threads 28 whereby the securing member 26 may be screwed into the base member against the bottom flange 32. The securing member 26 is provided with screw threaded openings 34 to receive bolts 36. The inner ends 38 of the bolts 36 abut against the outer surface of the plug 18 so that when the bolts are screwed into position they hold the plug 18 securely against the seating surface 16.

At the upper portion of the opening 14 the base member 12 is provided with an annular breech-lock device 42 for supporting the core and catalyst later to be described. This breech-lock device 42 is in the form of an inverted cup having laterally extending supporting feet 43 held in horizontal slots 44 in base member 12. Vertical slots 45 extend upward in base member 12 and connect with horizontal slots 44 so that the cup is introduced into the bottom of the reactor 10 and feet 43 fitted into verical slots 45 and then moved upwardly until horizontal slots 44 are reached and the cup is then turned so that the feet 43 rest on and are supported by the flanges forming the slots 45. The top 46 of the device 42 has openings 47 therein and a screen 48 is secured to the top 46 of the device 42 by bolt 49 to cover the openings 47.

Extending upwardly from the periphery of the base member 12 is a tubular member 50 which may be secured to the base member 12 in any desirable manner but is preferably welded to the base member 12 as shown at 51. Concentric with the outer tubular member 50 is an inner tubular member 56 which has its lower end received in an annular groove 58 in the base member 12. The smaller tubular member 56 is suitably secured to the base member 12, preferably by rolling. The upper end of the tubular member 56 is received in an annular cut away portion 62 in the top member 63 and is suitably secured thereto by rolling.

The upper portion of the outer tubular member 50 is secured to the top member 63, preferably by welding as shown at 54. While the tubular member 50 is shown in one piece on the drawings, it is to be understood that it may be formed from a plurality of tubular sections welded together to make the desired size.

While the inner tubular member 56 is shown in one piece on the drawings, it is to be understood that it may be formed from a plurality of pieces or tubular members welded together to form the desired length of tubular member. The space 64 between the concentric tubular members 56 and 50 provides an annular cooling space for cooling the catalyst and reactants during the reaction. An inlet 66 is provided in the base member 12 for introducing water into the bottom of the space 64 and a top outlet 68 is provided in the top member 63 for removing hot water and steam from the cooling space 64.

Positioned centrally of the tubular member 56 is an imperforate core member designated 72 which has an open bottom 74 and a closed top 76. As shown in the drawings, the core member is hollow in order to reduce the weight of the structure but, if desired, a solid core member may be used. Secured to the bottom of the core member is a screen cylinder 78 made of screen of the desired size in order to permit passage therethrough of the reaction products. The cylinder 78 is secured to the bottom of the core member 72 in any desired manner, preferably by welding. The bottom of the cylinder 78 is provided with spaced feet 84 as shown in Figs. 1 and 3 which rest on the breech-lock device 42 of the base member.

The core member 72 is provided with spacer members 86 which extend horizontally from the core member at spaced points along the length of the core member and contact the inner surface of the inner tubular member 56. Catalyst particles in the form of granules, lumps or pills, or the like, are introduced into the annular space between the core member and the tubular member 56 to provide an annular bed of catalyst 88. The upper portion of the core member 72 is provided with an eye member 92 whereby the core member may be lifted out of the reactor or placed into the reactor. While the core member is shown as of one piece construction in the drawings, it is to be understood that the core member may be formed from a plurality of pieces securely held together as by bolting or welding. The spacing members 86 may be attached to the core member 72 by welding, or the like, or may be formed integrally with the core member.

The top member 63 is provided with a central opening generally designated 94 and intermediate its ends the top member 63 is provided with an annular seating surface 96 for receiving the sealing member 98. The sealing member 98 comprises a plug which rests on the seating surface 96. The block 98 has a centering pin 102 extending from the top thereof which extends through a central opening 103 in a holding member 104. The holding member 104 is circular and has threads 106 on its periphery for engagement with threads on the top member 63 so that the holding member 104 may be screwed into place against the flange 108 in the top member 63.

Bolts 112 are provided which have screw threaded engagement with the holding member 104 as at 114 and after the holding member 104 is in place, screwing down on the bolts 112 will cause the inner ends 116 thereof to press against the sealing plug 98 to form a seal against leakage of pressure from the inside of the reactor.

The top member 63 is provided with an inlet opening 122 for the heated reactants. The heated reactants are introduced into the space 124 above the catalyst bed 88. The heated reactants pass downwardly over the catalyst particles in the catalyst bed 88 and the reaction products pass through the screen cylinder 78 into the space 126 within the screen thimble and then the reaction products pass downwardly to the space 128 above plug member 18. The base member 12 above the plug member 18 is provided with an outlet 132 for removing reaction products from the space 128.

While the heated reactants are passing downward through the catalyst bed 88, a cooling liquid is passed upwardly through the annular cooling space 64 to prevent the reaction from exceeding a certain temperature limit. In the selective polymerization of olefins it is important to control the temperature of reaction in order to obtain the best octane numbers and highest yields of products. While the invention is especially adapted for selective catalytic polymerization of hydrocarbon mixtures containing isobutylene and normal butylenes to produce polymers thereof having high octane numbers, it may be used for polymerization generally.

For example, a fresh feed contains about 15% isobutylene by volume and 30% of normal butylenes, by volume with the rest of the constituents comprising hydrocarbons of a $C_4$ refinery cut and mostly butanes. With the fresh feed a recycle stock containing about 0.4% of isobutylene by volume and about 25% of normal butylenes is mixed to form a total feed containing about 8.0% of isobutylenes and 28.0% normal butylenes by volume with the remaining part of the mixture containing substantially inert normally gaseous hydrocarbons. At the beginning of the operation the catalyst 88 is preferably heated to about 280° F. The catalyst may be any suitable polymerizing catalyst but is preferably solid phosphoric acid catalyst comprising diatomaceous earth impregnated with liquid phosphoric acid to form a dry catalyst. The use of this catalyst is well known. The catalyst is preferably in the form of cylindrical pills having a size of about $\frac{3}{16}$ of an inch by $\frac{3}{16}$ of an inch. The pressure is maintained at about 600 lbs./sq. in. in reactor space 124.

The hydrocarbon mixture containing the iso and normal butylenes is heated to a temperature of about 280° F. and is passed downwardly over the catalyst 88 in the reactor at such a velocity to give a residence time of the total feed in the reactor of about 60 seconds. With the cooling liquid passing through the cooling space 64, the temperature of the reaction is controlled and the reaction products leaving the reactor are at a temperature of about 288° F. The reaction products are passed to a suitable fractionator to separate the normally liquid polymerized product from gases which are recycled with fresh feed. The product comprises predominately iso-octenes such as trimethyl pentenes and dimethyl hexenes. The amount of iso-octene produced is about 11% by volume of the $C_4$ cut fed to the reactor. The octane number of the polymer product is 95 after hydrogenation.

Our invention includes the particular arrangement whereby an annular bed of catalyst is provided. With this arrangement, close temperature control is possible because of the relatively small distance of the catalyst from the cooling wall 56. In addition, the ratio of the cooling surface 56 to the catalyst volume can be varied over a range of 10 to 50 square feet per cubic foot of catalyst depending upon the degree of temperature control desired. With our arrangement, the optimum distance of the catalyst from the cooling wall and the optimum ratio of cooling surface to catalyst volume is obtained, thereby giving improved results for any latitude and sensitivity of temperature control required.

In our construction if the central core member 72 were removed and the entire space in the tubular member 56 filled with catalyst pills the results would be much inferior to our results as a lower octane number would be obtained for the product and a decreased yield would also be obtained. In order to approach our results, it would be necessary to use a smaller tube 56. However, our invention has definite advantages over smaller tubes in that the crushing strength of the body of the catalyst is increased. It is known that with a certain amount of carbonaceous material on the catalyst and with a certain pressure drop across the catalyst, the catalyst will be crushed and its usefulness as a catalyst destroyed. Where a tubular member is filled with catalytic material the only support for the catalyst particles is the inner wall of the tubular member.

With our construction the catalyst particles are supported by the inner wall of the tube 56 and also by the outer wall 140 of the core member 72. With smaller distances between the binding or bounding surfaces there is more tendency for the catalyst particles to arch and this helps to support the catalyst particles. In addition, the spacer members 86 assist in supporting the catalyst pills. The catalyst life is related to the ratio of binding or bounding surface to catalyst volume and to the length of the catalyst arch between the binding surfaces. In our arrangement the binding or bounding surface for the catalyst volume in the tube can be greater and the length of the catalyst arch is less than in the same size tube where no core member is used. Both of these factors cause the catalyst life to be increased.

The following data are included to give representative information on our invention:

5 in. reactor with 3 in. core

Total feed—8% isobutylene, 28% normal butylene (liq. vol.) _____
Temperature in _____ 280° F.
Temperature out _____ 288° F.
O. N.-A. S. T. M. clear of hydrogenated isooctenes _____ 95
Yield—isooctenes on total reactor feed _____ 11% (liq. vol.)
Life of catalyst, gals./lb_____ 200 (min.)
Sq. ft. of cooling surface per cu. ft. of catalyst _____ 15

Although the example cited applies to a case where the thickness of the catalyst bed is one inch, that is, the distance between the core and member 56 is one inch, obviously still closer temperature control with a longer catalyst life can be obtained with still thinner beds, and vice versa.

While we have shown a single reactor in the drawings, it is to be understood that a plurality of such reactors may be used in parallel.

We are not to be limited to the example above set forth as the example has been included for purpose of illustration and other mixtures may be polymerized, the proportions of the reactants may be varied and the temperature and pressure may be varied. By carrying the diameter of the core member for the same size reactor, the sensitivity of temperature control can be varied over a wide range depending on the thickness of the catalyst bed used.

While the invention is especially adapted for catalytic polymerization of olefins to produce high octane hydrocarbon mixtures, it is to be understood that the apparatus shown and the process disclosed is by way of illustration only and various changes and modifications may be made without departing from the spirit of the invention.

While downflow of reactant gases through the catalyst bed is preferred, upflow operation through the catalyst bed may be used.

We claim:

1. An apparatus adapted for carrying out selective catalytic polymerization of olefins including an annular reaction chamber having an inlet and an outlet, a bottom locking device removably mounted in said reaction chamber, a central imperforate core member spaced from the wall of said reaction chamber and having a bottom perforate section supported by said locking device, the annular space between the wall of said chamber and said core member being adapted to hold catalyst granules as an annular shaped bed, flat horizontally extending spacer members between the wall of said reaction chamber and said core member for assisting in supporting the catalyst in said reaction chamber and a heat exchange chamber surrounding said reaction chamber and adapted for the circulation of a cooling medium therethrough to remove heat from the reaction chamber during the reaction.

2. An apparatus of the character described including a housing, a vertical reaction chamber therein having an inlet and an outlet, a locking device detachably secured in the bottom of said reaction chamber and removable through the bottom of said reaction chamber, a central imperforate core member spaced from the wall of said reaction chamber and provided with a cylindrical perforate section at its lower end supported by said locking device, said locking device being hollow and open ended and communicating with said perforate section to permit passage of vapors between said reaction chamer and said locking device, the annular space between the wall of said reaction chamber and said core member being adapted to hold catalyst particles as an annular bed and a heat exchange chamber surrounding said reaction chamber.

3. An apparatus according to claim 2 wherein said housing is provided with top and bottom sealing devices whereby said reaction chamber may be maintained under superatmospheric pressure.

WALTER H. RUPP.
CLARKE T. HARDING.